United States Patent [19]

Gautschi et al.

[11] Patent Number: 5,029,483
[45] Date of Patent: Jul. 9, 1991

[54] MEASURING PLATFORM

[75] Inventors: Gustav Gautschi, Zurich; Peter Wolfer, Kleinandelfingen; Denis Kohler, Neftenbach, all of Switzerland

[73] Assignee: Kistler Instrumente A.G., Winterthur, Switzerland

[21] Appl. No.: 393,218

[22] Filed: Aug. 14, 1989

[30] Foreign Application Priority Data

Sep. 30, 1988 [EP] European Pat. Off. ........ 88116253.1

[51] Int. Cl.⁵ .............................................. G01L 5/16
[52] U.S. Cl. .................................. 73/862.04; 73/172
[58] Field of Search ................ 73/862.04, 172, 862.38, 73/862.54, 862.65, 862.62; 128/782; 177/134, 211

[56] References Cited

U.S. PATENT DOCUMENTS

| | | | |
|---|---|---|---|
| 2,411,251 | 11/1946 | Feld | 92/90 |
| 3,906,931 | 9/1975 | Terekhov | 73/862.04 |
| 4,047,427 | 9/1977 | Young | 73/862.04 |
| 4,088,015 | 5/1978 | Wolfer | 73/862.04 |
| 4,398,429 | 8/1983 | Cook et al. | 73/862.04 |

FOREIGN PATENT DOCUMENTS 383678B 8/1987 Australia .
949522 2/1964 United Kingdom .

*Primary Examiner*—Donald O. Woodiel
*Attorney, Agent, or Firm*—Barnes & Thornburg

[57] ABSTRACT

A measuring platform having at least one force transducer rigidly fixed to either the base or cover element and to the other of the base or cover element movably to minimize measuring errors due to bending of the cover element under forces to be measured.

5 Claims, 5 Drawing Sheets

MEASURING PLATFORM

BACKGROUND AND SUMMARY OF THE INVENTION

The present invention relates to a measuring platform consisting of components, in particular a cover plate and a base part, joined by at least one force transducer between them.

Such measuring platforms, as are employed typically in biomechanics, serve to measure forces in one or more directions, and occasionally torques as well. For example the foot forces of a person walking are measured, whereby the vertical component, the horizontal component in the direction of walking, and the lateral force component are analyzed. The cover plate is usually level with the ground, while the base part may consist of a base plate or frame and be installed permanently in the floor, in a recess in a gangway for example. However the base part may also consist of only four feet for instance.

A fully formed measuring platform enables the three components $F_x$, $F_y$ and $F_z$ of a force F acting on the platform L to be measured, also the three components $M_x$, $M_y$ and $M_z$ of the resulting moment vector. Usually the measuring platform has four force transducers arranged in a rectangle, with each transducer capable of measuring the three components $F_x$, $F_y$ and $F_z$ of a force acting on it from any direction. The x and y coordinates run parallel with the sides of the rectangle formed by the four force transducers, while the z coordinate stands vertical to them. The coordinate origin is generally located in the medium plane of the transducers. The z axis of the coordinate system is located so that it pierces the surface of the cover plate in the middle of the rectangle formed by the four force transducers. The electrical signals produced by the four force measuring cells are generally added partially (in parallel circuitry) and evaluated in a calculating unit so that not only the required force components, but also the components $a_x$ and $a_y$ of the force application point and the torque T about the z axis, can be determined. The formulas for measuring and calculating the forces, force application points and torques are known, for example J. Tichy and G. Gautschi, Piezoelektrische Messtechnik, Springer Verlag, pp. 175-181. Another example is Swiss Patent PS 502 590, which in addition gives an example of the circuitries to be employed.

The known measuring platforms generally comprise four piezoelectric force transducers, though platforms with more or fewer force transducers are possible also. Thus for example, a platform with three force transducers is used for measuring metal cutting operations. Instead of piezoelectric transducers, force transducers based on other principles are possible also, such as resistance, capacitance etc. It should be noted that these alternatives may be employed for the present invention also.

When a pressure acts on a conventional platform, it bends downward. The pressure does not have to be a single force, it can just as well be the resultant of several individual forces. Moreover, it will not generally be a pure pressure force but the vertical component acting in the z direction of a force at a polyhedral angle to the platform. The bending of the measuring platform has metrological consequences, as shown in FIG. 1. In this drawing. 1 denotes the cover plate of the measuring platform, 2 the force transducers (only two are shown), and 3 the base plate A force $F_z$ acting vertically to the platform bends this down. The amount of this deflection depends on the rigidity of the cover plate, which in turn depends on the dimensions of this plate and the material used for it. In any case, the pressure force $F_z$ causes bending moments and shear forces designated $My_1$, $My_2$, $Fx_1$ and $Fx_2$ in FIG. 1, whereby the indices refer to the individual force transducers. Owing to the deflection, the loading of the transducers is unequal, as is shown schematically in FIG. 2. Their sensitivity, linearity and stability are impaired by this.

Significant also are the adverse metrological effects of the torques $My_1$ and $My_2$ and the shear forces $Fx_1$ and $Fx_2$. Numerous applications for such measuring platforms, in biomechanical examinations for example, call for the definition as exactly as possible of the coordinates of the force application point $a_x$ and $a_y$ (not shown), measured on the surface of the cover plate 1 (FIG. 1). Calculations reveals that the measuring error $\Delta a_{x,y}$ for $a_x$ and $a_y$ is proportional to the difference of the torques $\Delta M_{x,y}$ about the corresponding axis (x or y). With any eccentric force application point of $F_z$ with the coordinates $a_{x,y}$, the measuring error $\Delta a_{x,y}$ may be considerable, so that it cannot be ignored.

The shear forces $Fx_1$ and $Fx_2$ shown in FIG. 1 generally cause "cross-talk" onto the axial force Fz, which is due to the imperfection of the transducers. If a cross-talk of typically 2% is assumed from the shear force onto the axial force for the transducers, in the output signal of each transducer 2% of $Fx_1$ and of $Fx_2$ will be added to the measurements of $Fz_1$ and $Fz_2$ respectively. The resulting measuring error may be considerable, apart from the fact that $Fx_1$ and $Fx_2$ are not linear functions of Fz. There may also be cross-talk from $Fx_1$ include and $F_2$ onto the force components $Fy_1$ and $Fy_2$, which are then measured error.

Therefore, it is an object of the invention to provide a measuring platform, on which the occurrence of measuring errors due to the bending of the cover plate of the platform under loading is avoided wholly or at least to a very large extent.

This objective is achieved by connecting the force transducer or transducers to one of the cover plate or the base part or base plate essentially rigidly, and connecting the transducer with the other part movably, so that bending moments and shear forces resulting from the deflection of the cover plate can be compensated for substantially, preventing them causing any of the measuring errors named. For example the two expressions $\Delta a_{x,y}$ and $\Delta M_{x,y}$ become equal to nil, because the moments become zero.

According to developments of the invention, the connection essentially free of fixing moments between force transducer and the relevant part of the measuring platform comprises a suitable joint device, such as self-aligning ball bearing, radial ball-and-socket joint, axial ball-and-socket joint etc. or alternatively a suitable elastic supporting element, such as a hydraulic element or intermediate link, or a vessel filled with liquid. According to another development of the invention, the connection may also take the form of a flexible supporting tube fixed to one of the components. The force transducer is . preferably braced against one of the components by a clamp screw that may be flexible.

Other objects, advantages and novel features of the present invention will become apparent from the following detailed description of the invention when considered in conjunction with the accompanying drawings.

DETAILED DESCRIPTION OF THE DRAWINGS

Figure 1:
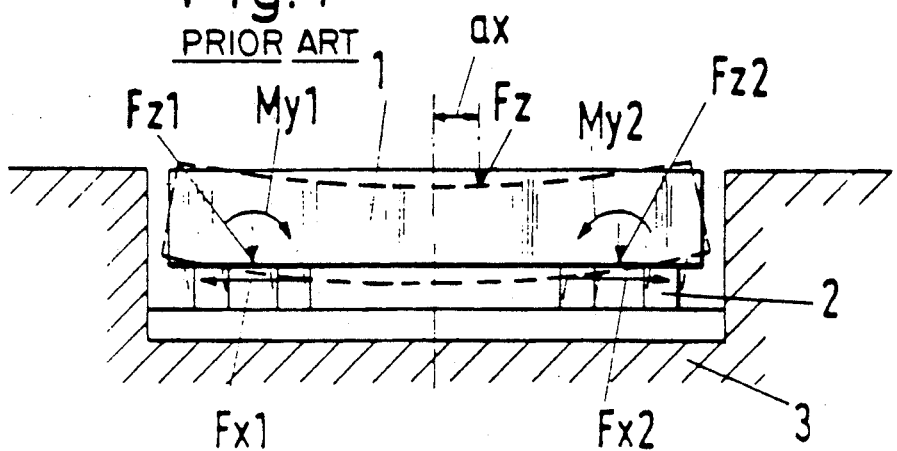
FIG. 1 is a sideview of measuring platform of the prior art bending under load.

In the drawings the same or similar parts have the same reference numbers.

Figure 2A:
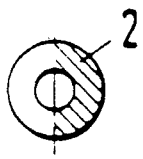
FIGS. 2a, 2b are schematical of loading of two force transducers located opposite in the measuring platform according to FIG. 1.
Figure 2B:
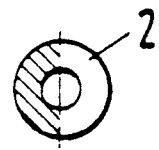

FIGS. 1, 2a and 2b showing the state of the art have been described already.

Figure 3:
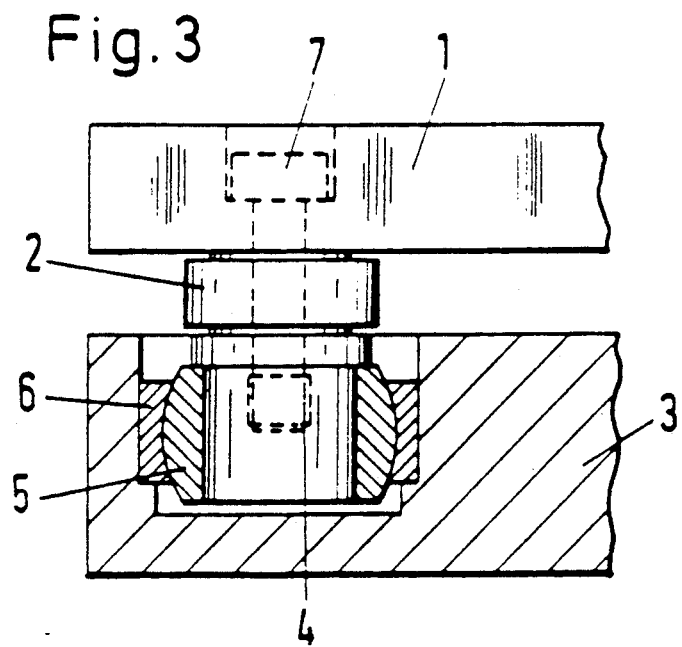
FIG. 3 is a partial cross-sectional view of a measuring platform according to the invention with the connection of the force transducer to the base plate without fixing moments by a ball joint arrangement.

FIG. 3 shows a detail from a measuring platform according to a preferred embodiment of the invention, in which the connection essentially free of fixing moments of the force transducer 2 (in this case consisting of one or more piezoelectric quartz disks) to the base plate 3 is effected with a mechanical linkage in the form a ball joint 5,6. The transducer 2 may have one face in direct contact with the cover plate 1, while from the opposite face a carrier 4 for the head 5 of the ball joint projects. A clamp screw 7 is braced with its head in cover plate 1 of the measuring platform and extends through the transducer 2 to the screw connection with the carrier 4 of the ball head. The transducer 2 can be preloaded by the clamp screw 7. The socket 6 of the ball joint is held in the base plate by suitable means. The center of curvature of the ball joint 5, 6 is located so that no forces act on the pivot of the ball joint when the cover plate 1 bends. Otherwise such forces might be transmitted onto the base plate 3, and, as reaction forces, set up shear forces in the transducer 2, thus falsifying the measurement.

The ball joint 5, 6 should be designed as free from friction as possible, in order to prevent the occurrence of friction-induced bending moments when the cover plate 1 is deflected. Preferably therefore, at least the surfaces of the ball head 5 and socket 6 sliding against each other are of suitable plastic, such as polytetrafluoroethylene (PTFE) or a composite of plastic and metal. Of course the invention is not confined to the joint arrangement shown; any other suitable linkage may be used, based for example on self-aligning ball bearings, radial or axial ball-and-socket joints. The force transducers 2 are, according to the invention, joined essentially rigidly to the cover plate 1, to take up the forces acting on them which are to be measured (including the shear forces). On the other hand, the connection of the force transducers 2 with the base plate 3 is freely rotatable to take up the bending moments and shear forces which occur when the cover plate 1 is loaded and bends. The two functions: rigid connection with the cover plate and connection with the base plate free of fixing moments, are performed on the one hand by the ball joint 5, 6 and on the other hand by the transducers 2 being braced or pressed firmly against the cover plate 1. Of course this configuration could be reversed also, with a rigid connection of the force transducers 2 to the base plate 3 and a connection essentially free of fixing moments to the cover plate 1.

Figure 4:
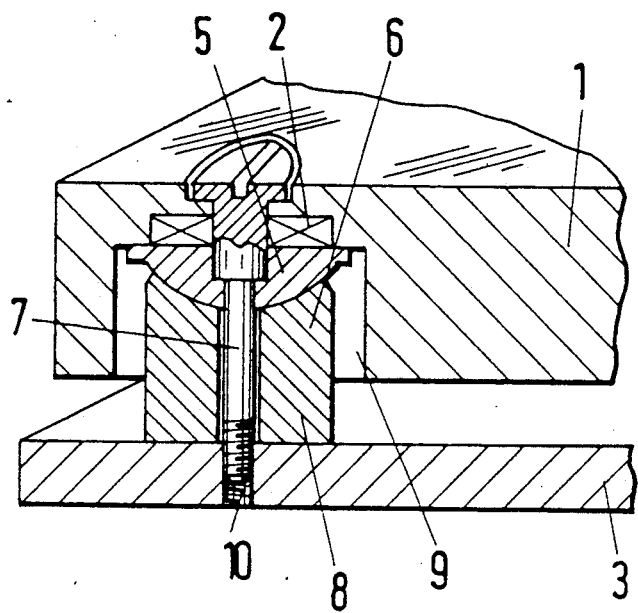
FIG. 4 is a partial cross-sectional view of a measuring platform according to the invention with the connection of the force transducer to the base plate by a modified ball joint arrangement braced against the base plate, whereby both the transducer and the ball joint are braced by a flexible clamp screw.

FIG. 4 shows a detail of a measuring platform according to another embodiment of the invention, with the connection essentially free of fixing moments comprising a ball joint 5, 6 supported by a cylinder 8 on the base plate 3. A flexible clamp screw 7 extends from the cover plate 1 through the force transducer 2, the ball joint 5, 6 and the supporting cylinder 8 into a threaded hole in the base plate 3, so that the parts can be tightened together by the flexible clamp screw 7. The ball joint 5, 6 and the flexible clamp screw 7 provide a support for the force transducer 2 essentially free of fixing moments. FIG. 4 differs essentially from the embodiment according to FIG. 3 in its simplified design, with the moving surfaces of the ball joint 5, 6 substantially parallel with the cover plate 1, whereas in the embodiment according to FIG. 3 they are disposed essentially vertical to it. The force transducer 2 lies directly on the head 5 of the ball joint, while its socket 6 may be formed in the supporting cylinder 8, which spaces the cover plate 1 with the force transducer 2 in contact with it from the base plate 3. The clamp screw 7, which passes through cover plate 1, transducer 2, ball head 5, socket 6, supporting cylinder 8 and base plate 3 in that order and tightens these parts together, is of suitable flexibility so that it can yield elastically against bending of the cover plate 1. The hole in the supporting cylinder 8 is dimensioned with radial clearance for the clamp screw 7 to allow movement of the ball joint.

Figure 5:
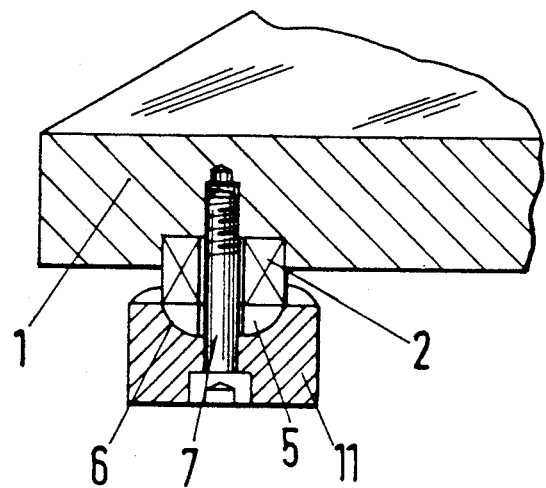
FIG. 5 is a partial cross-sectional view of a measuring platform similar to FIG. 4 but with the base plate replaced by feet.

FIG. 5 shows a detail of a measuring platform similar to FIG. 4 but with feet 11 instead of the base plate 3 and supporting cylinder 8. Generally each force transducer 2 is provided with one of these feet 11. Simplified measuring platforms of this kind are desirable for certain applications in biomechanics. FIG. 5 also shows the possibility of introducing from below, i.e. from the foot 11, the central clamp screw 7, which is flexible and must have sufficient clearance in the holes of transducer 2 and ball-and-socket joint 5, 6. The threaded hole taking the screw is then in the cover plate 1.

Instead of providing a joint between the force transducer and one of the components of the measuring platform, flexural elasticity and hence freedom from fixing moments may be obtained in other ways also, as shown in the embodiments illustrated in FIGS. 6 to 9.

Figure 6:
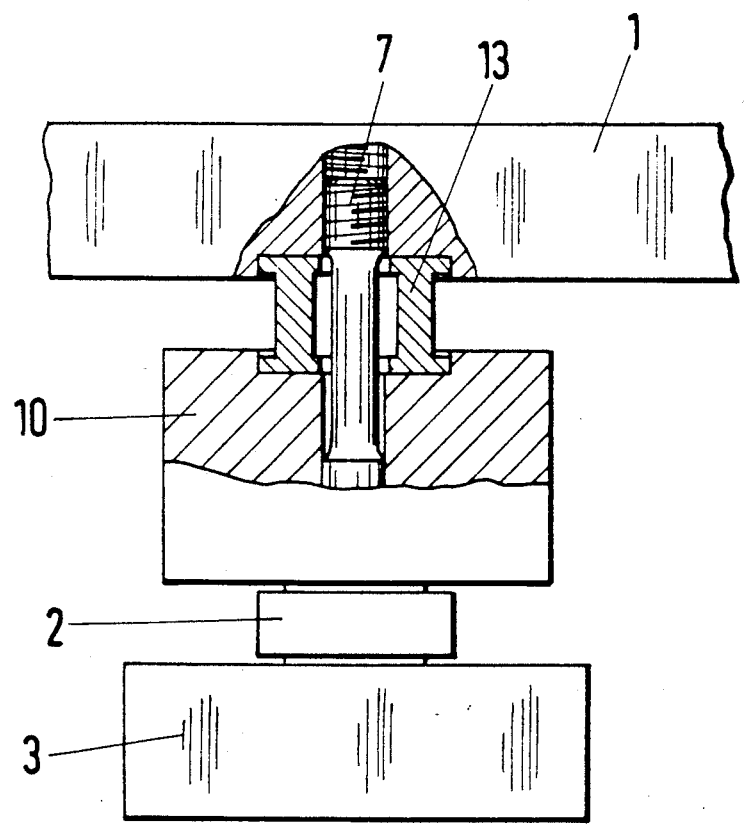
FIG. 6 is a partial cross-sectional view of measuring platform with elements providing the connection free of fixing moments arranged on the cover plate side.

FIG. 6 shows a measuring platform, according to the invention, with the connection free of fixing moments provided on the cover plate side, while the force transducer 2 is joined rigidly to the base plate 3. A flexible carrier tube 13, which however behaves substantially rigidly against lateral displacements, is fitted firmly in the cover plate 1, and is braced there against by the flexible clamp screw 7 extending from an intermediate body 10. This intermediate body 10 is joined to the force transducer 2, which in turn is fixed rigidly on the base plate 3. The flexural elasticity of the carrier tube 13 and the clamp screw 7 make the measuring platform essentially free from fixing moments under loading.

The embodiment shown in FIG. 6 shows also that the connection of free of fixing moments between the cover plate 1 and the force transducer 2 can be provided from the cover plate side too, with the force transducer accordingly joined rigidly to the base plate 3. The connection may be configured in this way for all embodiments of the invention and visa verse for this embodiment.

Figure 7A:
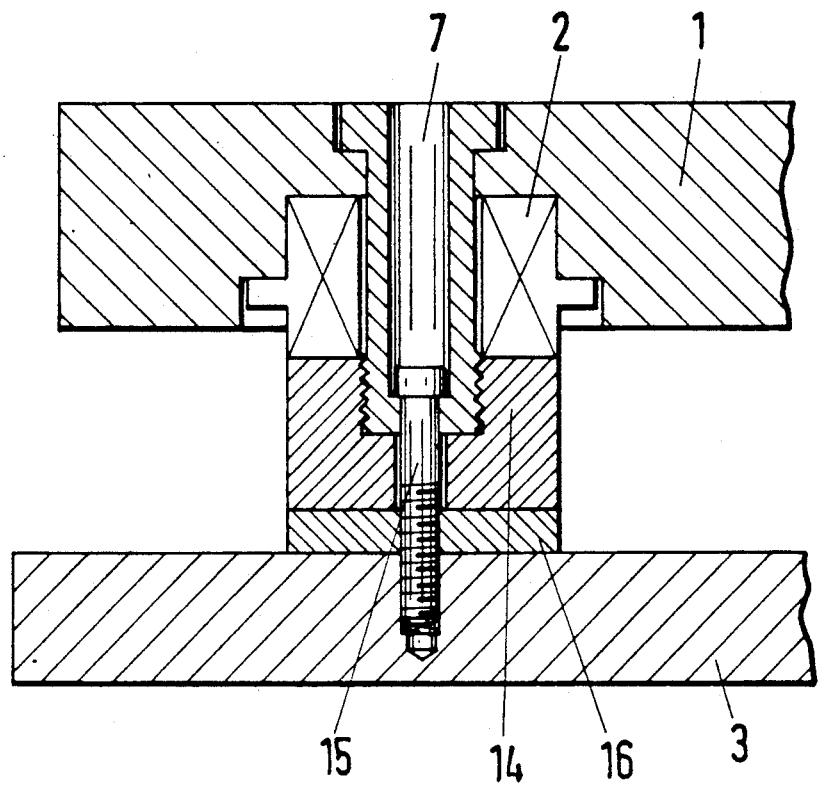
FIG. 7a is a partial cross-sectional view of a measuring platform in which the connection free of fixing moments of the force transducer with the base plate is with an elastic supporting element, whereby the transducer is preloaded by a rigid screw on the cover plate and the elastic supporting element is anchored on the base plate through a flexible screw.
Figure 7B:
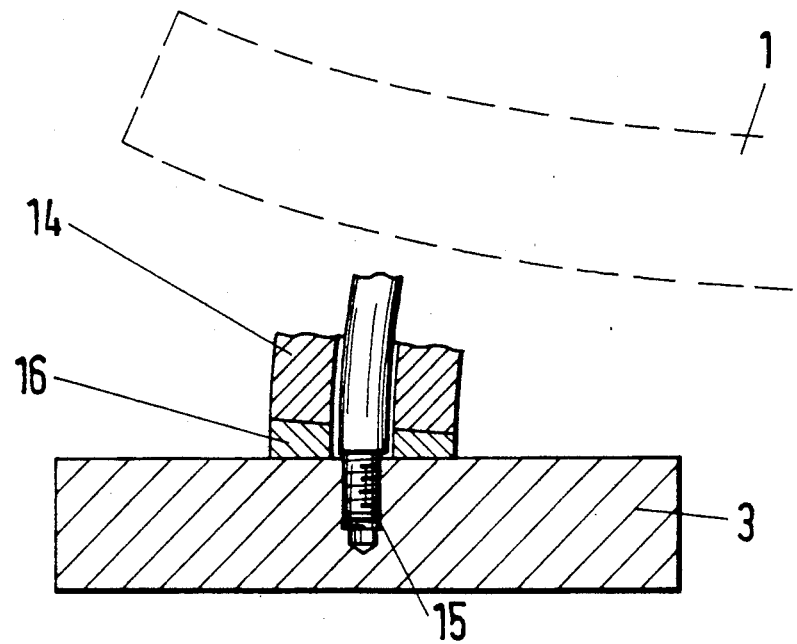
FIG. 7b is a partial cross-sectional view of the measuring platform according to FIG. 7a in the loaded state (the cover plate shown schematically is bent).

FIGS. 7a and 7b show an embodiment whereby the flexible connection, therefore free from fixing moments, between the force transducer 2 and the base plate 3, is provided in the form of an elastic, annular supporting element 16. This embodiment of the invention is especially suited for applications as in biomechanics for example, though also in mechanical engineering, where only forces acting vertically (previously designated with $F_z$) are measured. The elastic supporting element 16 consists preferably of a reversibly deformable plastic material, such as elastomer. The force transducer 2, located in a recess in the cover plate 1, can be braced against the cover plate 1 by a rigid, central, hollow clamp screw 7. The hollow clamp screw 7 is threaded into a clamping part 14, and serves to support a flexible fixing screw 15, which passes through the clamping part 14, and serves to support a flexible fixing screw 15, which passes through the clamping part 14 and the elastic supporting element 16 into a threaded hole in the base plate 3. Instead of the arrangement described, the elastic supporting element 16 could be joined to the clamping and base parts 14, 1 by other means, such as cementing. This allows preassembly of the transducer 2 to the course plate 1. Alternatively, a flexible screw 7 could be used, extending from the cover plate to the base plate 3.

FIG. 7b shows schematically the measuring platform according to the embodiment in FIG. 7a in the loaded state, with the cover plate 1 bent, the fixing screw 15 bent sideways, and the elastic annular supporting element 16 deformed.

Figure 8:
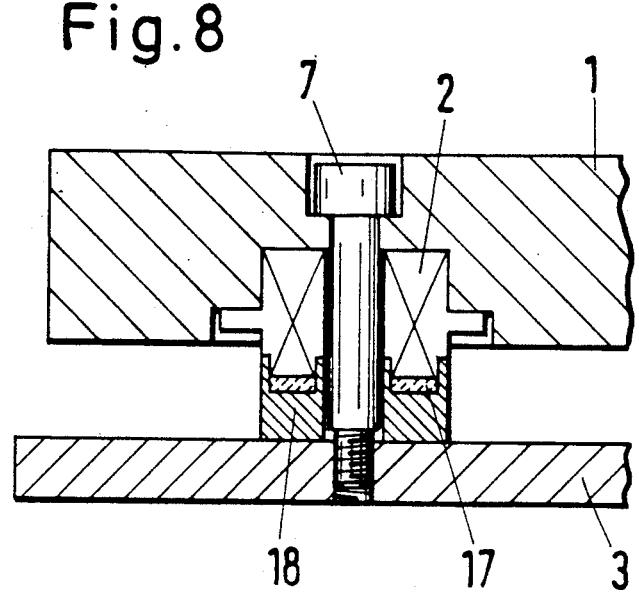
FIG. 8 is a partial cross-sectional view of a measuring platform in which the connection of the force transducer to the base plate free of fixing moments includes supporting elements in the form of annular hydraulic intermediate links.
Figure 9:
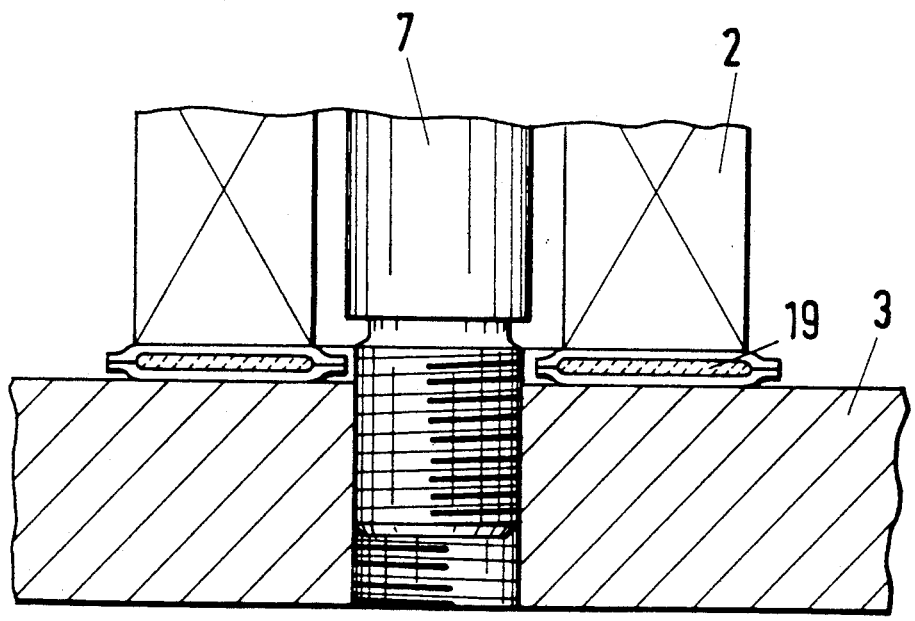
FIG. 9 is a partial cross-sectional view of a connection free of fixing moments consisting of an annular vessel filled with liquid.

The embodiments of the invention shown in FIGS. 8 and 9 also include elastic supporting elements or intermediate links yielding more or less to all sides.

The embodiment shown in FIG. 8 achieves flexural elasticity in the connection between force transducer 2 and base plate 3, and hence freedom from fixing moments, by a hydraulic annular intermediate link 17 filled with liquid, which is supported on the base plate 3 through a carrier 18. The clamp screw 7 introduced from above, i.e. from the cover plate 1, and passing through the transducer 2, hydraulic intermediate link 17 and carrier 18, enters a thread in the base plate 3 and serves to preload the transducer 2 among other things. The clamp screw 7 must be flexible, so that it can yield when the cover plate 1 is loaded. The central holes through the force transducer 2 and carrier 18 allow the clamp screw lateral clearance.

FIG. 9 shows an embodiment with the connection, free of fixing moments between the force transducer 2 and the base plate 3, is achieved by a vessel 19 filled with liquid. Otherwise this embodiment corresponds to that shown in FIG. 8, except that the vessel 19 filled with liquid rests directly on the base plate 3, and the carrier 18 being omitted.

With the present invention, the measuring errors due to the bending of the cover plate of a measuring platform under loading are eliminated wholly or to a large extent. This opens up new applications for platform metrology, where the measuring errors occurring with known measuring platforms were unacceptable for numerous purposes, especially in biomechanics.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A measuring platform comprising:
   a cover element;
   a base element;
   at least one force transducer; and
   connection means including a ball joint connecting said force transducer rigidly to a first element of said cover or base elements and movably with respect to a second element of said cover or base elements for minimizing measuring errors due to bending of said cover element under forces to be measured.

2. A measuring platform according to claim 1, wherein said connection means further includes a flexible fastener securing said cover element to said base element through said force transducer and ball joint.

3. A measuring platform according to claim 1, wherein said connection means includes a flexible carrier tube fastened to said first element.

4. A measuring platform according to claim 1, wherein said force transducer is secured to said first element by a first securing means and said cover and base element are joined by a second securing means.

5. A measuring platform comprising:
   a cover element;
   a base element;
   at least one force transducer; and
   connection means connecting said force transducer rigidly to a first element of said cover or base elements and movably with respect to a second element of said cover or base elements for minimizing measuring errors due to bending to said cover element under forces to be measured,
   wherein said connection means includes at least one hydraulic element between said force transducer and said second element.

* * * * *